No. 774,987. PATENTED NOV. 15, 1904.
S. D. LINDSAY.
ROPE MEASURING AND DELIVERING DEVICE.
APPLICATION FILED MAY 25, 1904.
NO MODEL. 4 SHEETS—SHEET 1.

No. 774,987. PATENTED NOV. 15, 1904.
S. D. LINDSAY.
ROPE MEASURING AND DELIVERING DEVICE.
APPLICATION FILED MAY 25, 1904.
NO MODEL. 4 SHEETS—SHEET 2.

Witnesses,
Inventor,
Samuel D. Lindsay,
By Offield, Towle & Linthicum
Attys.

No. 774,987. PATENTED NOV. 15, 1904.
S. D. LINDSAY.
ROPE MEASURING AND DELIVERING DEVICE.
APPLICATION FILED MAY 25, 1904.
NO MODEL. 4 SHEETS—SHEET 3.

Witnesses,
Inventor,
Samuel D. Lindsay,
Attys.

No. 774,987. PATENTED NOV. 15, 1904.
S. D. LINDSAY.
ROPE MEASURING AND DELIVERING DEVICE.
APPLICATION FILED MAY 25, 1904.
NO MODEL. 4 SHEETS—SHEET 4.
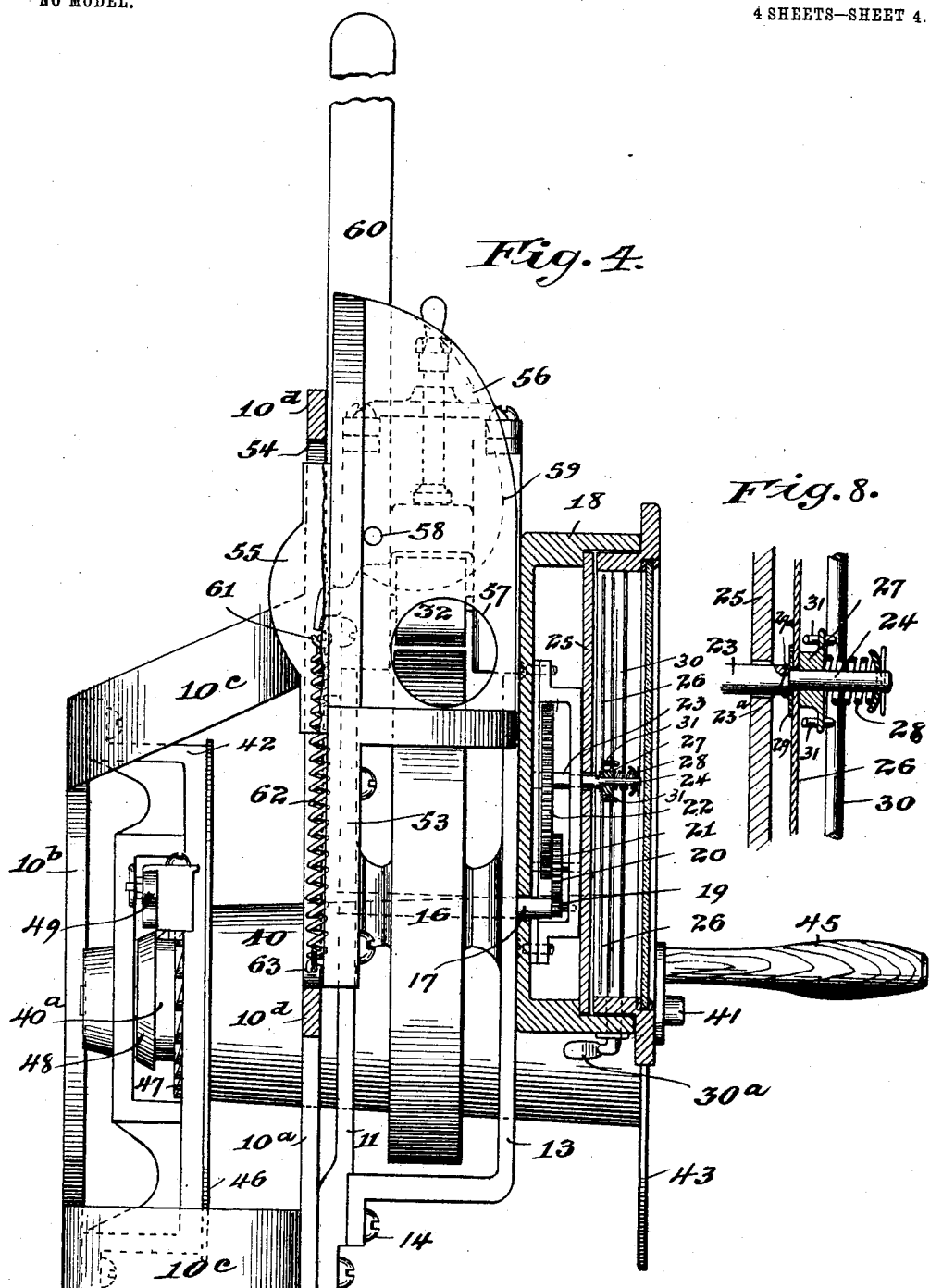

No. 774,987.

Patented November 15, 1904.

UNITED STATES PATENT OFFICE.

SAMUEL D. LINDSAY, OF CHICAGO, ILLINOIS.

ROPE MEASURING AND DELIVERING DEVICE.

SPECIFICATION forming part of Letters Patent No. 774,987, dated November 15, 1904.

Application filed May 25, 1904. Serial No. 209,783. (No model.)

*To all whom it may concern:*

Be it known that I, SAMUEL D. LINDSAY, a citizen of the United States, residing at Chicago, in the county of Cook and State of Illinois, have invented certain new and useful Improvements in Rope Measuring and Delivering Devices, of which the following is a specification.

My invention relates to an apparatus for measuring, cutting, and delivering predetermined amounts or lengths of rope, cable, and the like.

My invention is primarily designed to provide a substitute for the slow methods of delivering predetermined quantities of rope and the like at present extensively in vogue, consisting, substantially, of unwinding the rope from a reel or drum, measuring off the desired length with a yardstick or tape, severing the same by hand, and, finally, coiling the quantity delivered into a form convenient for delivery.

To this end my invention consists of an apparatus which comprises in a single structure a device for measuring the amount of rope delivered as it is withdrawn from the reel, winding or coiling it up as it is withdrawn into a convenient form for delivery, and, finally, severing the amount withdrawn when the meter indicates the delivery of the predetermined quantity.

My invention in the best mechanical form which I have as yet devised for the same is illustrated in the accompanying drawings, wherein—

Figure 1:
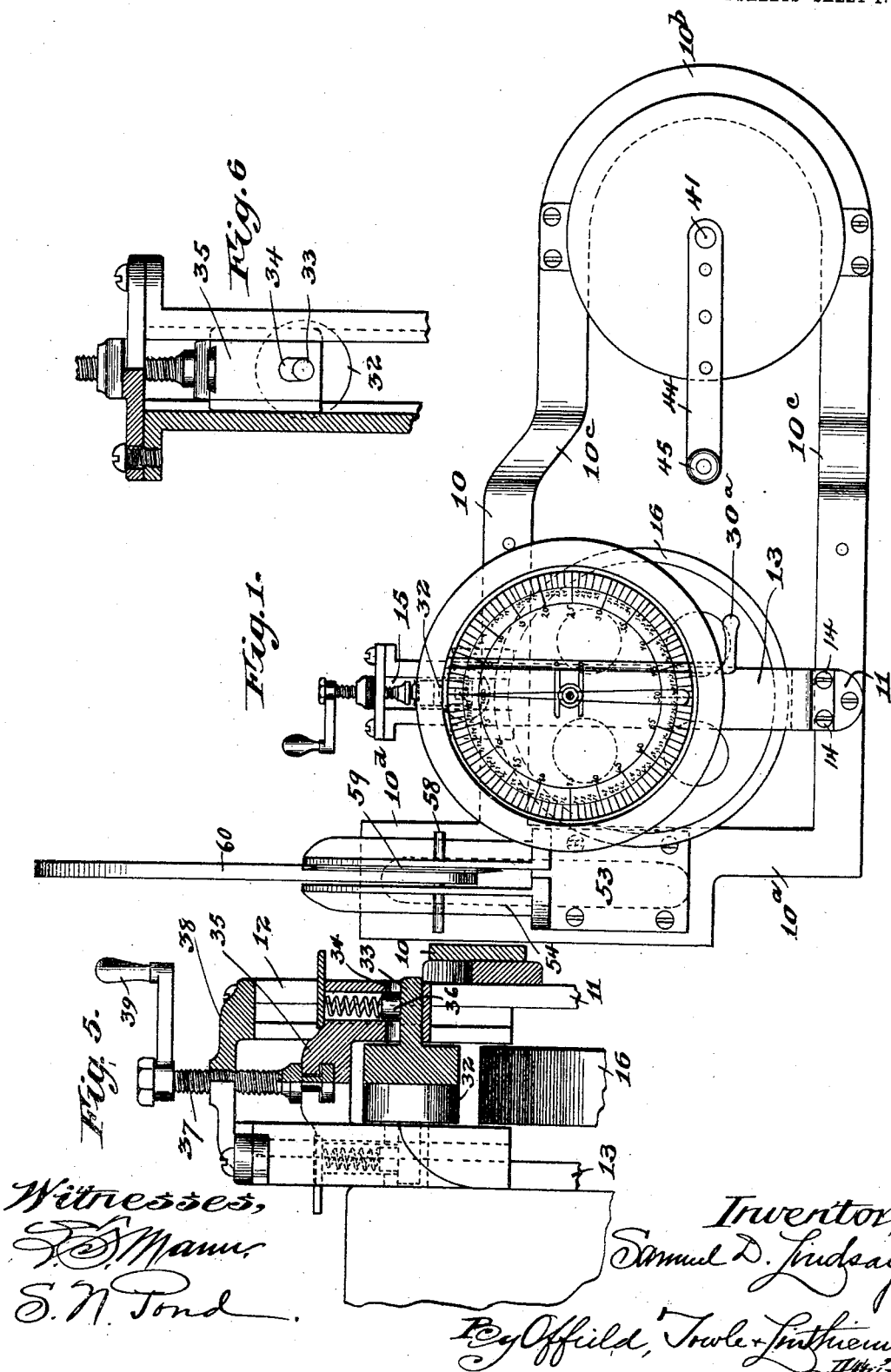
Figure 2:
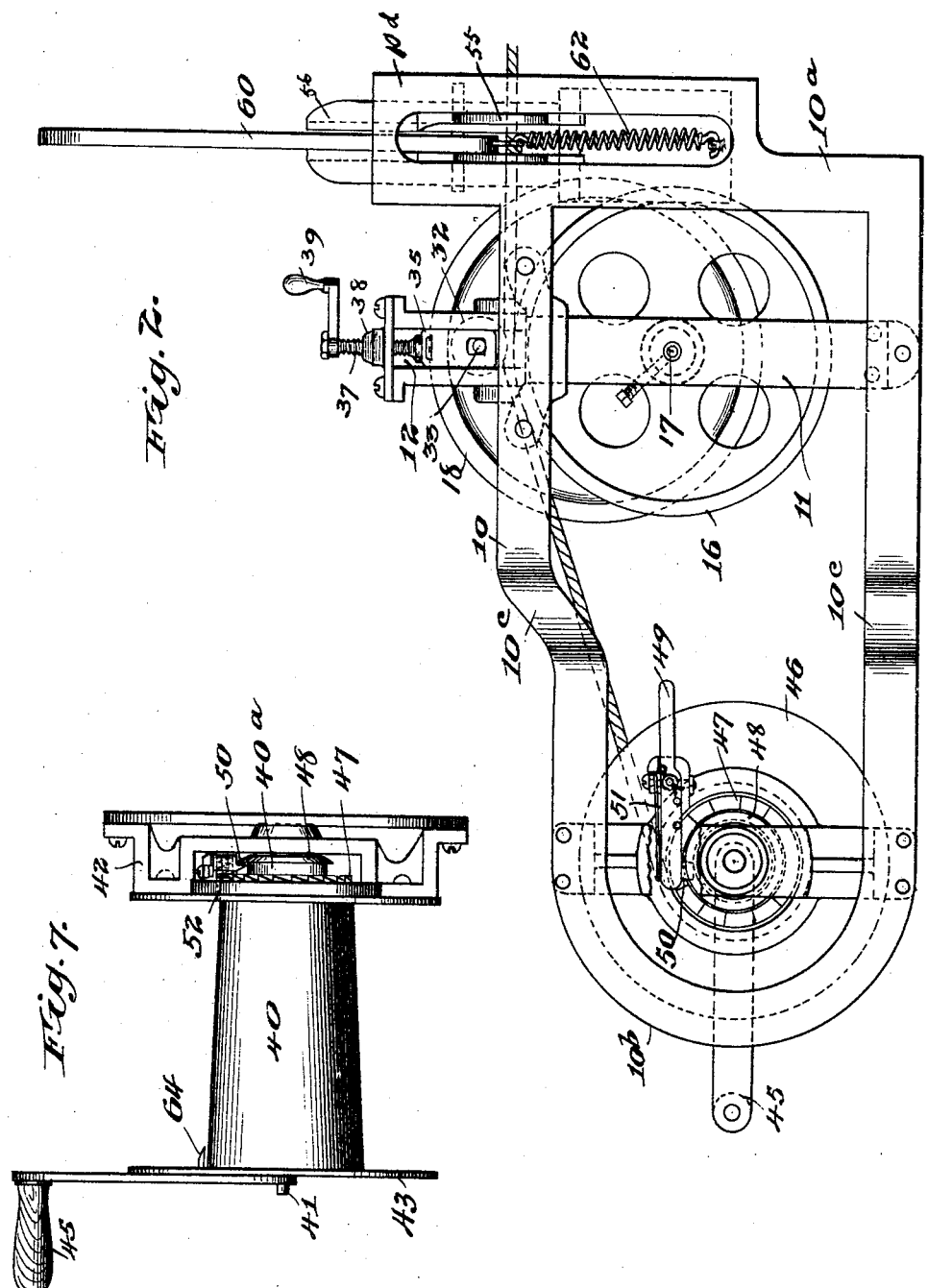
Figure 3:
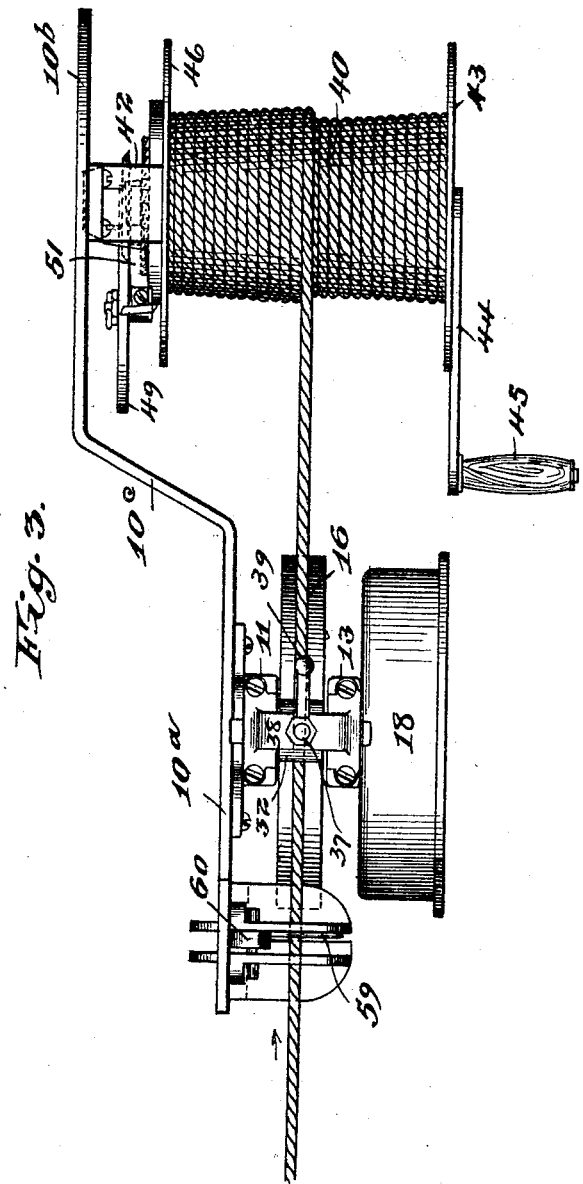

Figure 1 is a side elevational view of the complete apparatus. Fig. 2 is a similar view from the opposite side with certain parts broken away. Fig. 3 is a top plan view. Fig. 4 is an end view with certain parts in vertical section. Fig. 5 is a detail view, partly in vertical section, of a portion of the measuring mechanism. Fig. 6 is a detail view, partly in vertical section, of the mechanism shown in Fig. 5 in a plane at right angles to the plane of the latter figure. Fig. 7 is a detail view of the receiving-spool, and Fig. 8 is a detail sectional view enlarged through the friction mechanism that engages the counterweighted pointer of the meter-dial.

Referring to the drawings, 10 designates as an entirety the main supporting-frame, which is preferably in skeleton form and may be conveniently made of suitably-bent strap-iron. The two opposite end portions $10^a$ and $10^b$ of the frame are laterally offset from each other, being connected by an inclined intermediate portion $10^c$. Secured to and connecting transversely the upper and lower members of the end section $10^a$ of the frame is a bar 11, Fig. 2, the upper end portion of which, extending above the frame, is vertically slotted for some distance, as shown at 12. 13, Figs. 3 and 4, designates the companion upright to the bar 11, disposed parallel thereto, the lower end of which is bent at a right angle and extended inwardly and connected to the lower end of the bar 11, as by the screws 14, while its upper end has a vertical slot 15, Fig. 1, opposite to and coextensive with the slot 12. Between the uprights 11 and 13 is mounted a disk 16, the same being fast on an axle 17, Fig. 4, which extends inwardly of the dial-case 18, secured at its back to the upright 13. The inner end of the shaft 17 is formed with or has fast thereon a pinion 19, which through a train of gears and pinions 20, 21, and 22 actuates a dial-shaft 23, which latter has a reduced end portion 24 projecting through a central aperture in the dial-face 25, whereon is loosely mounted a pointer 26, the lower end of which is counterweighted so as to return the pointer to zero position when the latter is permitted to turn freely on the spindle. As a means for normally rendering the pointer fast with the spindle I employ an annularly-flanged collar 27, Fig. 8, mounted on the spindle 24 in front of and bearing against the pointer under the compressive action of a coil-spring 28, thus crowding the pointer frictionally against a washer 29, having on its rear face small projections $29^a$, that enter one or more holes or radial grooves $23^a$ in the face of the annular shoulder of the shaft. One feature of my invention relates to a means for permitting the pointer to return to zero position after each operation of the machine, which means consists in a manually-operable device for relieving the effect of the spring 28 by retracting the collar 27, this device, as herein shown, consisting of a rod 30, rotatably mounted in the rim of the dial and extending across the face of the latter, this rod being provided with a pair of inwardly-extending bent arms 31, which lie back of the flange of the collar 27, permitting the rotation of the latter, but serving to retract said collar when the rod 30 is partially turned, for which purpose the latter has at its lower end a bent handle 30$^a$.

The disk 16 is turned by the frictional engagement with its periphery of the rope or other article to be measured and delivered, and to provide against any slip of the rope on said disk I provide above the latter a roller 32, Figs. 5 and 6, this roller having rigid axles or spindles 33, which are journaled in vertically-elongated bearings 34 in an inverted-U-shaped yoke 35, the vertical members of which lie within and are guided by the slots 12 and 15 of the dial-supporting uprights. The elongated bearings 34 are for the purpose of permitting a limited vertical play of the roller 32, due to unevennesses in the thickness of the material engaged thereby, the roller being normally pressed into engagement with the latter by spring-pressed upper bearings 36, accommodated by vertical slots in the arms of the yoke 35. The yoke 35, with its contained roller 32, is bodily adjustable vertically to accommodate rope of varying diameters by means of a screw-threaded stem 37, swiveled at its lower end in the yoke and having threaded engagement with a cross-bar 38, connecting the upper ends of the uprights 11 and 13, the upper end of said threaded stem carrying a crank 39, by which it may be turned in either direction.

On the end 10$^b$ of the main supporting-frame is mounted a receiving-spool, the drum of which is designated by 40. The spool is rotatably mounted on a shaft 41, that projects horizontally from the face of a vertically-disposed supporting-frame member 42, secured at its upper and lower ends to the frame 10$^b$. The outer head of the spool (designated by 43) is stationary with the drum and has secured thereto a crank-arm 44, having a handle 45 at its outer end, while the opposite spool-head 46 is secured rigidly to the outer face of the support 42, having a central opening large enough to admit therethrough the inner and smaller end of the drum, (the latter being preferably of slightly-conical formation, as shown.) The inner end of the drum has formed on its face an annular ratchet 47, Figs. 4 and 7, with a reduced portion 40$^a$ extending beyond the ratchet and provided on its outer face with a beveled annular flange 48. Pivoted to a laterally-projecting member of the support 42 is a lever 49, the inner end of which has a depending tooth 50, which when the spool is in its operative position on the shaft 41 lies behind the flange 48, locking the spool on the shaft, being normally held in such position by a leaf-spring 51, secured at one end to the support on which the lever is pivoted and at its other end bearing upon the inner toothed end of the lever, as most clearly shown in Fig. 2. The lever 49 also has secured to the side thereof nearest the spool a spring-pawl 52, the free end of which overlies the annular ratchet on the end of the spool-drum and coöperates with the teeth of the latter, permitting rotation thereof in a direction to wind up the rope on the drum, but preventing backward slip of the latter.

The portion 10$^a$ of the main supporting-frame has integral with or secured to its extreme end a vertically-extending supporting-plate 10$^d$, to which is bolted the frame-plate 53 of a cutter. The support 10$^d$ has a vertical slot 54 formed therein and extending approximately the entire length thereof, through which slot pass rearwardly-extending guides 55 on the back of the cutter frame-plate 53, the latter also having a pair of integral parallel forwardly-projecting walls 56 lying in the same planes with the respective guides 55 on the rear of the plate 53, the walls 56 having formed therethrough registering holes 57, located opposite the bite between the meter-disks 16 and 32, as most clearly shown in Fig. 4.

Pivoted in and between the walls 56 on a removable pivot-pin 58 is a cutter comprising, as herein shown, a semiheart-shaped blade 59, secured at its straight edge to a straight operating bar or handle 60, projecting upwardly of the upper end of the cutter-frame 53. The lower end of the bar 60 has attached thereto a hook 61, to which is removably secured the upper end of a coil expansion-spring 62, the lower end of the latter removably engaging a hook 63, projecting from the rear face of the frame-plate 53 near the lower end of the latter. The tension of the spring 62 normally maintains the cutter arm or handle in the upright position, (shown in the drawings,) with the cutter-blade lying above the openings 57, across which latter it is designed to pass with a shearing cut when the cutter-handle is operated.

The operation of the apparatus, briefly described, is as follows: With the parts in the relative positions shown in Fig. 1 and the pointer of the dial at the zero-mark the end of the rope, from which a predetermined length is to be withdrawn and severed, is passed through the registering holes 57 of the cutter, thence through and between the disk 16 of the meter and its superposed compression-roller 32, being then secured to the winding-spool in any suitable manner, as by being hooked on a pointed pin 64, projecting from the inner face of the rotatable spool-head 43 close to the periphery of the spool. The vertical position of the compression-roller 32 is then adjusted by turning the crank 39 to suit the diameter of the particular rope or other article introduced to the machine, so as to press upon the latter sufficiently to insure a driving friction of the rope upon the periphery of the disk 16, and the handle of the receiving-spool is then turned, winding up the rope or cable thereon until the pointer of the meter indicates the passage through the machine of the predetermined length or amount of material, whereupon the cutter-arm is swung downwardly, carrying the blade across the rope and severing it. Another turn of the winding-spool brings the severed end free from the meter, after which by depressing the outer end of the lever 49 the drum of the spool with the coil of rope thereon may be withdrawn from the shaft, the drum then withdrawn from the coil, and the latter secured in its coiled form by a string or otherwise ready for delivery. When the machine is to be used again, the pointer of the meter is returned to the zero position by simply pressing inwardly the bent end or handle 30$^a$ of the rod 30, which through the fingers 31 retracts the collar 27 from pressing engagement on the face of the pointer, thus allowing the latter to drop by its gravity effect to the vertical or zero position. The described mounting of the compression-roller 32 is of importance, since it renders the machine capable of handling ropes and cables of any diameter up to the distance between the vertical uprights of the roller-carrying guide, while the spring-pressed vertically-yieldable bearings of the compression-roller permit the latter to yield and accommodate itself to unevennesses in the transverse dimension of the material treated. The described construction of the receiving-spool also contributes largely to the general convenience and handiness of the apparatus, since the drum of the spool is readily removable to withdraw the completed coil although securely locked against both backward rotation and bodily displacement while the machine is operating.

It will thus be seen that my invention provides a comparatively simple, inexpensive, and convenient apparatus for facilitating the delivery of predetermined amounts or lengths of rope or cable with a minimum of labor and delay as compared with purely manual methods of performing the same operations.

Although I have described the machine as designed to operate upon rope, cords, and cables, yet it is obvious that by simply widening the delivery-apertures of the cutter, the friction-rolls of the meter, and the receiving-spool the apparatus would be equally well adapted for measuring and delivering other materials of the same general nature, such as wire fencing, wire-cloth, or any other woven or twisted goods commonly designated as to quantity in terms of linear measurement. It is also obvious that the apparatus as herein shown and described might be considerably modified in respect to details and construction or arrangement without departing from the principle of the invention or sacrificing any of the advantages thereof. I do not, therefore, limit the invention to the particular construction and relative arrangement shown and described, except to the extent indicated in specific claims.

I claim—

1. In a device of the character described, the combination with a skeleton frame having a pair of upper and lower substantially horizontal bars horizontally offset substantially centrally thereof, and vertical connecting-brackets uniting the upper and lower members of the offset portions of the frame, respectively, of a receiving-spool mounted on the bracket connecting the rearwardly-offset portions of the frame, and a registering device and actuating mechanism therefor mounted on the bracket connecting the forwardly-offset portions of said frame, substantially as described.

2. In a device of the character described, the combination with a supporting-frame, of a receiving-spool mounted thereon, a register also mounted thereon having a counterweighted pointer loosely mounted on the pointer-shaft, means for connecting said pointer to said shaft so as to turn therewith, and manually-operable means for disconnecting said pointer and allowing it to swing to the zero position of the dial, and a register-actuating device geared to said pointer-shaft of the register and engaged and actuated by the material passing to the spool, substantially as described.

3. In a device of the character described, the combination with a supporting-frame, of a receiving-spool mounted thereon, a register also mounted thereon having a counterweighted pointer loosely mounted on the pointer-shaft, spring-actuated means for frictionally connecting said pointer to said shaft so as to turn therewith, and manually-operable means for retracting said spring-actuated means and allowing the pointer to swing to the zero position of the dial, and a register-actuating device geared to said pointer-shaft of the register and engaged and actuated by the material passing to the spool, substantially as described.

4. In a device of the character described, the combination with a supporting-frame, of a receiving-spool mounted thereon, a registering device also mounted thereon, a rotatable disk geared to the pointer-shaft of the register and actuated by peripheral contact with the material passing to the spool, slotted guides extending radially of and beyond the periphery of said disk, a yoke mounted in and between said guides, a compression-roller carried by said yoke, and means for adjusting the latter longitudinally of its supporting-guides, substantially as described.

5. In a device of the character described, the combination with a supporting-frame, of a receiving-spool mounted thereon, a registering device also mounted thereon, a rotatable disk geared to the pointer-shaft of said registering device and actuated by peripheral contact with the material passing to the spool, slotted guides extending radially of and beyond the periphery of said disk, a cross-bar connecting the upper ends of said slotted guides, a yoke mounted in and between said guides, a compression-roller journaled in the depending arms of said yoke, a threaded stem passed through said cross-bar and swiveled in said yoke, and an operating-handle on said threaded stem, substantially as described.

6. In a device of the character described, the combination with a supporting-frame, of a meter mounted thereon, a fixed shaft projecting laterally from said frame beyond said meter, a spool rotatably mounted on said shaft, the inner end of said spool being provided with a beveled annular lip or flange, and a spring-actuated lever pivoted on the frame and provided with a self-locking tooth or lug engaging said annular flange to prevent withdrawal of the spool, substantially as described.

7. In a device of the character described, the combination with a supporting-frame, of a register mounted thereon, a register-actuating device engaged and actuated by the passage of the material thereover, a fixed shaft projecting laterally from said frame beyond said register, a spool rotatably mounted on said shaft, the inner end of said spool being provided with a ratchet and an annular lip or flange, and a lever pivoted on the frame and provided with a locking tooth or lug engaging said annular flange to prevent withdrawal of the spool and also provided with a pawl engaging said ratchet to prevent backward rotation of the spool, substantially as described.

8. In a device of the character described, the combination with a supporting-frame, of a receiving-spool mounted on one end thereof, a register mounted on the intermediate portion thereof, a register-actuating device in rear of said register engaged and actuated by the passage of the material thereover to the spool, a cutter-support mounted on the opposite end of the frame and provided with parallel projecting guards having registering transverse apertures disposed in the path of the material to the register-actuating device, and a cutter pivotally mounted in and confined between said guards and operable across the space between said apertures of the guards, substantially as described.

SAMUEL D. LINDSAY.

Witnesses:
 JENNIE NORBY,
 FREDERICK C. GOODWIN.